Aug. 5, 1969

L. PARKIN 3,459,096

SPRING CLIP

Filed Sept. 15, 1967

INVENTOR
LESLIE PARKIN
BY James R O'Connor
ATTORNEY

United States Patent Office 3,459,096
Patented Aug. 5, 1969

3,459,096
SPRING CLIP
Leslie Parkin, Bobbers Mill, England, assignor, by mesne assignments, to United-Carr Incorporated, Boston, Mass., a corporation of Delaware
Filed Sept. 15, 1967, Ser. No. 667,968
Claims priority, application Great Britain, Oct. 5, 1966, 44,502/66
Int. Cl. F16b 19/00, 21/00
U.S. Cl. 85—8.8                                    1 Claim

ABSTRACT OF THE DISCLOSURE

The U-shaped spring clip for assembly with a headed stud comprises a base and an arm connected thereto by a resilient bight portion. The base is provided with releaseable latching means engageable with the arm to hold it in a position wherein it is under tension by the resilient bight portion.

---

This invention relates to a spring clip for assembly with a stud, more particularly a stud projecting from a member to be secured to an apertured support.

The present invention provides a spring clip for assembly with a headed stud carried on a member to be attached to an apertured support, the clip comprising a base having an arm integrally connected therewith by a flexible bight portion whereby the arm is tensioned to urge it away from the base, the base being provided with releaseable latch means engageable with the arm to retain it in a predetermined position under tension, the base and arm being formed with aligned apertures through which the shank of the stud is adapted to extend, the apertures being of such dimensions that when the shank is inserted the headed end of the stud is engaged by the arm so that on release of the latch means the arm, in moving away from the base, will exert pressure on the head so as to transmit axial movement to the shank tending to cause it to move further through the aperture in the base of the clip so that the said member is urged towards the support.

The apertures in the base and arm may be of the keyhole type such that the head of the stud can be passed through a portion of the slot and when the clip is moved transversely relative to the stud and the shank is positioned in a narrower portion of the slot in the arm so that the arm underlies the head.

The clip may be made from a single blank of spring steel formed to provide a flat bas having an integral arm including a flat medial portion extending in spaced generally parallel relation to the base and connected to one end thereof by an arcuate bight portion. The free end of the arm is inclinde away from the base and the edge of the base remote from the bight is bent to form a latch arm extending substantially normal to the base and provided with a resilient tongue for engaging the free end of the resilient arm.

To enable the invention to be fully understood, it will now be described, by way of example, with reference to the accompanying drawings in which.

Figure 1:
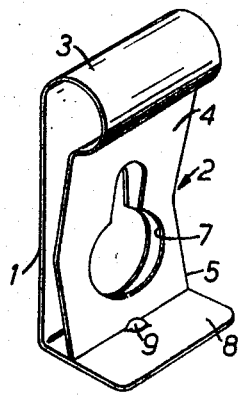
FIGURE 1 is a perspective view of a spring clip according to one embodiment of the invention, the resilient arm being shown engaged by the latch means.
Figure 2:
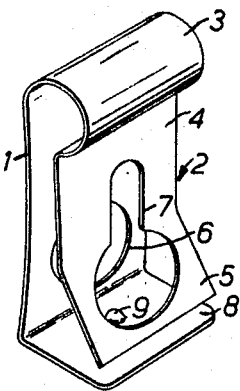
FIGURE 2 is a view similar to FIGURE 1 but showing the resilient arm released from the latch means.

As shown in the drawings, the clip is formed from a single blank of spring metal and comprises a substantially flat base 1 having an integral resilient arm 2 connected to one end of the base by an arcuately shaped bight portion 3. The arm includes a substantially flat mediat portion 4 overlying the base in spaced generally parallel relation and a free end portion 5 which is inclined away from the base. The base and arm are formed with aligned keyhole slots 6,7, respectively.

At the end remote from the bight 3, the base 1 is provided with a latch plate 8 extending substantially normally to the base and formed with an inwardly projecting latch lug 9.

Figure 3:
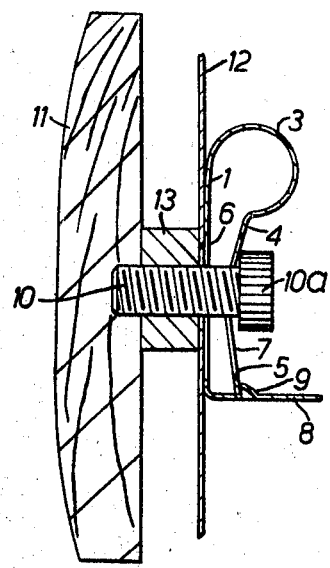
FIGURE 3 is a sectional side view of the clip assembled on a stud carried by a member to be secured to an apertured support, the resilient arm being shown in the position illustrated in FIGURE 1.
Figure 4:
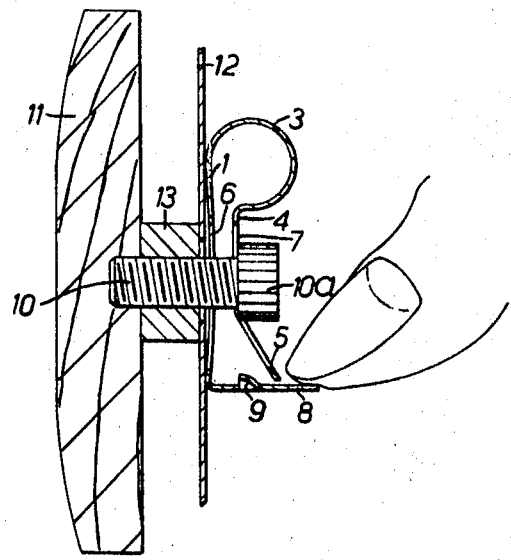
FIGURE 4 is a view similar to FIGURE 3 but showing the resilient arm in a position illustrated in FIGURE 2.

As illustrated in FIGURES 3 and 4, the clip is used for applying axial pressure to a stud 10 attached to a member 11 and is adapted to draw the member into abutment with an apertured support 12. In the particular example shown in the drawings, the member 11 is a facia panel to be attached to a support 12, which in this case is a dash panel of a motor vehicle. The panel 11 will be provided with a plurality of studs 10, each having a head 10a and the dash panel 12 is formed with apertures for receiving the studs and having a diameter slightly greater than that of the head 10a.

The facia panel is presented to the dash panel and the stud heads inserted through the apertures in the dash panel. Rubber washers 13 surrounding the shanks of the studs abut the opposed faces of the dash panel 12 and facia panel 11, and the stud heads project beyond the opposite face of the panel 12 to that abutted by the washers.

With the resilient arm of the clip engaged by the latch lug 9 as shown in FIGURE 1, a clip is assembled with each stud by inserting the heads through the circular portions of the keyhole slots and the clips are then shifted laterally of the heads to position the shanks of the studs in the narrower portions of the slots so that the portions of the resilient arms at the edges of these narrower portions of the slots underlie the heads of the studs as indicated in FIGURE 3. When in this position the latch plate 8 is flexed outwardly by manually applied pressure to release the latch lugs 9 from the end of the portion 5 of the resilient arms and the latter are thereby free to spring away from the base under the influence of the arcuate bight portions 3. When released the arms exert axial pressure on the respective studs to draw them further through the apertures in the dash panel so that the washer 13 is drawn into close abutting engagement with the adjacent faces of the support and the facia panel is securely retained.

The clip according to the invention is particularly useful where there is very little or only limited access to the face of the support remote from that to which the facia panel is to be attached. In this case it is either very difficult or impossible to use tools such as a screwdriver to tighten up nuts on the studs so as to draw the facia panel into abutment with the support. By using the clip the studs which will normally be a loose fit in the apertures in the support are readily drawn into tight abutment with the support merely by releasing the latch plate 8, and this releasing operation does not require the use of any tool. If the clip needs to be removed, it is only necessary to press portion 5 of the arm inwardly towards the base until its free end snaps under the latch lug 9. This releases the pressure on the stud head and the clip can then be shifted laterally and removed. The resiliency of the engagement of the resilient arm with the stud will hold the member 11 tightly in assembly and obviate any tendency for it to rattle.

While the invention is particularly applicable for applying axial pressure to studs on members to be secured to apertured supports, it will be understood that the invention is not necessarily limited in this respect.

I claim:
1. A spring clip for assembly with a headed stud carried on a member to be attached to an apertured support, the clip comprising a base, an arm integrally connected to said base by a flexible bight portion whereby said arm is tensioned to urge it away from the base, said arm terminating in a free end remote from said bight portion, and a latch plate extending substantially normal to said base at the end thereof proximate the free end of said arm, said latch plate carrying an inwardly projecting lug which is releasably engageable with the free end of said arm to retain said arm in a predetermined position under tension, said base and said arm having aligned apertures therein for receipt of said stud, said apertures being so dimensioned that when the stud is received therein the head thereof is engaged by said arm and when said lug is disengaged from the free end of said arm, said arm, under the bias of said resilient bight portion, will exert pressure on the stud head so as to transmit axial movement to said stud tending to cause it to move further through the aperture in the base of the clip, said arm, when in said predetermined position, being positioned closer to said base than when said arm is disengaged from said lug.

References Cited
UNITED STATES PATENTS

| | | | |
|---|---|---|---|
| 708,903 | 9/1902 | McClay | 85—8.8 |
| 1,038,664 | 9/1912 | Schell | 85—8.8 |
| 1,903,129 | 3/1933 | Peterson | 85—8.3 |
| 1,947,921 | 2/1934 | Potter et al. | 85—8.8 |
| 3,259,006 | 7/1966 | Dukatz et al. | 85—8.8 |

EDWARD C. ALLEN, Primary Examiner